United States Patent Office 2,735,308
Patented Feb. 21, 1956

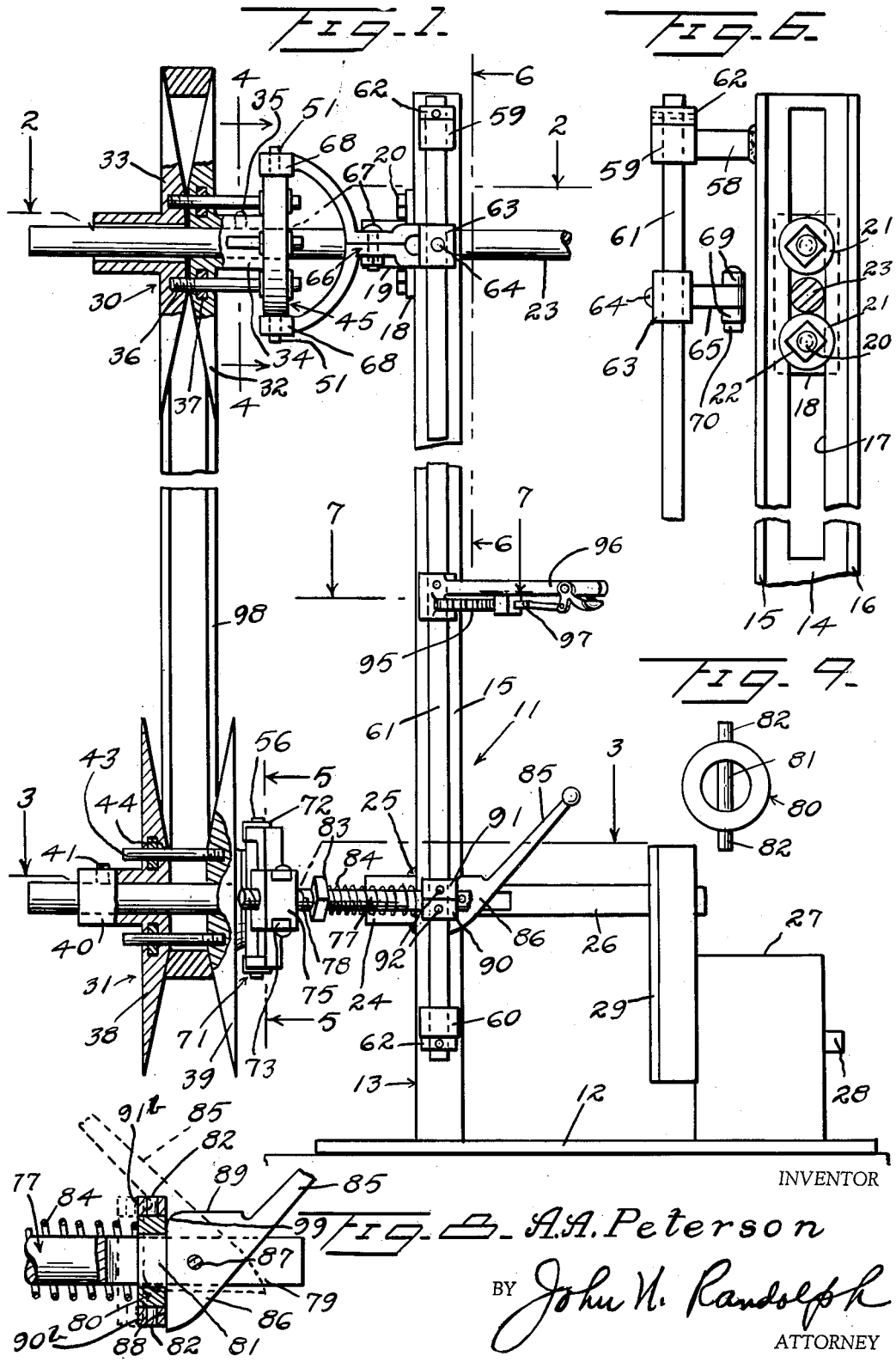

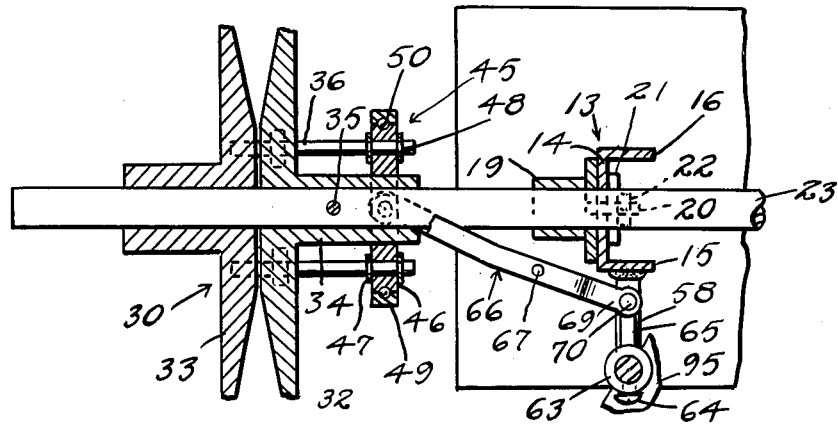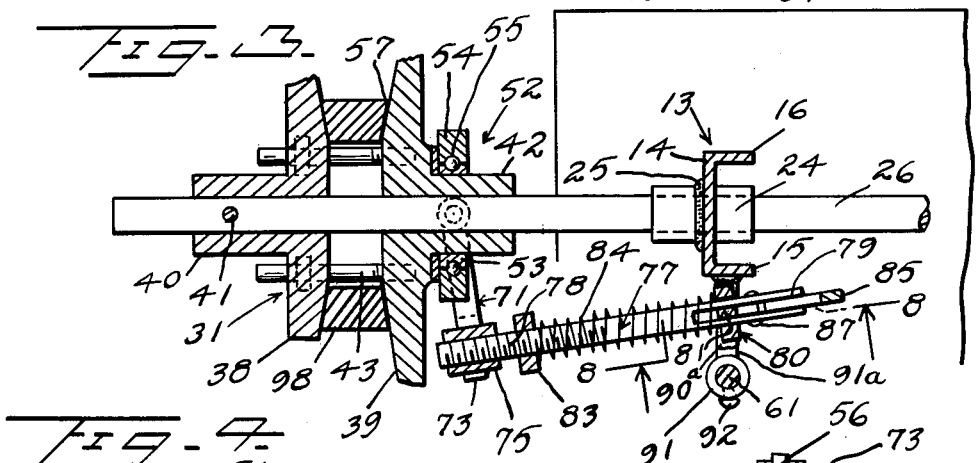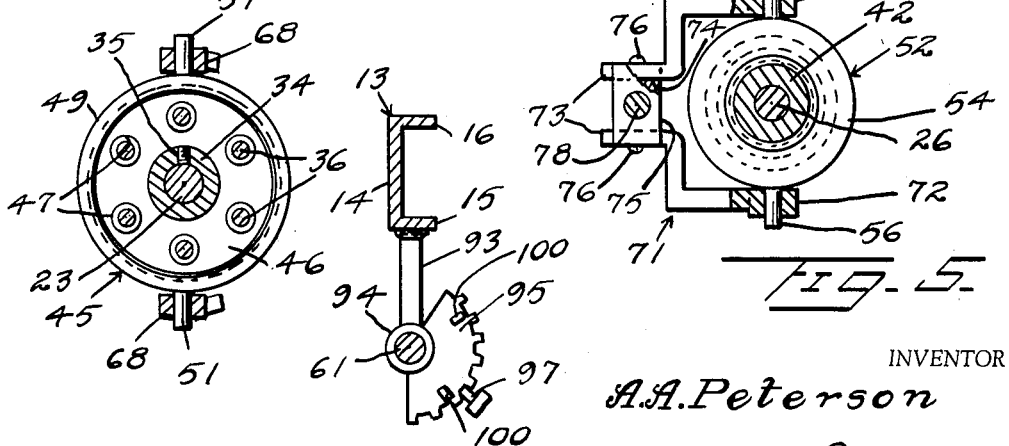

2,735,308

VARIABLE SPEED DRIVE AND CLUTCH

Alf A. Peterson, Hallock, Minn.

Application February 11, 1955, Serial No. 487,575

4 Claims. (Cl. 74—230.17)

This invention relates to an improved variable speed drive and clutch constituting an improvement on my prior U. S. Letters Patent No. 2,577,913, issued December 11, 1951, and also entitled "Variable Speed Drive and Clutch."

It is a primary object of the present invention to provide a variable speed drive and clutch for connecting a drive shaft and a driven shaft by a belt and pulleys to enable rotation of the shafts at variable speeds relative to one another, and wherein the shafts may be disposed at considerable distances from one another without adversely affecting the operation of the apparatus or its utility.

Another object of the invention is to provide a variable speed drive and clutch wherein a spring tension is maintained on at least one of the pulleys for maintaining a proper tension on the belt to thus substantially eliminate slippage and minimize wear, and wherein the spring tension on the belt is not varied by adjustment of the device to vary the relative speeds of rotation of the shafts.

Still another object of the invention is to provide an improved variable speed drive and clutch including novelty constructed belt pulleys which are readily adapted for use with large V-belts which are too stiff to properly engage an inner pulley portion of small circumference.

Another object of the invention is to provide an improved construction of belt pulley for use with the variable speed drive and clutch which eliminates the necessity for splining the slidably movable section of the pulley to the shaft on which the pulley is carried.

Various other objects and advantages of the invention will hereinafter become more fully apparent from the following description of the drawings, illustrating a presently preferred embodiment thereof, and wherein:

Figure 1 is a side elevational view, partly in section and partly broken away, of the variable speed drive and clutch;

Figure 2 is a fragmentary cross sectional view thereof, taken substantially along a plane as indicated by the line 2—2 of Figure 1 and on an enlarged scale;

Figure 3 is an enlarged fragmentary cross sectional view, taken substantially along a plane as indicated by the line 3—3 of Figure 1;

Figure 4 is an enlarged fragmentary detail view taken substantially along a plane as indicated by the line 4—4 of Figure 1;

Figure 5 is a view similar to Figure 4, taken substantially along a plane as indicated by the line 5—5 of Figure 1;

Figure 6 is a fragmentary detail view taken substantially along a plane as indicated by the line 6—6 of Figure 1, partly in section and primarily in elevation;

Figure 7 is a fragmentary detail sectional view, taken substantially along a plane as indicated by the line 7—7 of Figure 1;

Figure 8 is an enlarged fragmentary detail sectional view, taken substantially along a plane as indicated by the line 8—8 of Figure 3, and Figure 9 is an elevational view of one element of the device.

Referring more specifically to the drawings, the variable speed drive and clutch unit in its entirety and comprising the invention is designated generally 11 and in the form thereof as illustrated is shown provided with a base member 12 which may be mounted on or secured to any suitable supporting surface. An elongated frame member or post 13 is fixed to and projects perpendicularly from the base member 12. While the frame or post 13 is shown in the drawings as being disposed in an upright position, the base 12 could be disposed and secured in any position so that the frame 13 may be disposed in a horizontal position or any other suitable position. The frame or post 13, which is of channel shape cross section, may be of any desired length and includes a front wall 14 and side walls 15 and 16. The front wall 14 is provided with an elongated slot 17 which extends longitudinally thereof and is disposed remote from the base 12. A plate 18 having a bearing sleeve 19 projecting from one side thereof and opening therethrough is disposed against an outer side of the front wall 14 and has bolts 20 extending through end portions thereof and loosely through the slot 17. Washers 21 and nuts 22 engage the bolts 20 for clamping the plate 18 in different adjusted positions endwise of the frame 13. The washers 21 bear against the inner side of the front wall 14 and are disposed between said wall 14 and the nuts 22. A driven shaft 23 extends loosely through the slot 17 and plate 18 and is journalled in the bearing 19.

A sleeve type bearing 24 extends through the front wall 14 near the other end of the frame 13 and has an intermediate portion disposed in the wall 14 and secured thereto, as by welding, as seen at 25. A drive shaft 26 has a portion journalled in the bearing 24. In the form of the invention as disclosed, a motor 27 is shown mounted on the base 12 and the shaft 28 thereof is connected, as by a suitable reduction gear unit 29, to one end of the drive shaft 26. However, said drive shaft 26 may be connected to any suitable source of power by which it may be rotatably driven.

A V-shaped pulley, designated generally 30, is mounted on a driven shaft 23, and a similar V-shaped belt pulley 31 is mounted on the drive shaft 26. Said belt pulleys are disposed substantially in alignment and to the left of the frame 13, as seen in Figure 1. The belt pulley 30 includes a pair of cone shaped disks 32 and 33. The inner disk 32 which is disposed nearest the frame 13 has an inwardly extending hub 34, which projects away from the outer disk 33 and which carries a setscrew 35 by means of which the disk 32 is fixed to the driven shaft 23. The outer disk 33 is slidably mounted on the shaft 23 and has a plurality of pins 36 secured thereto and which project inwardly therefrom slidably through openings 37 of the inner disk 32. The pins 36 are concentrically disposed around the shaft 23 and are radially spaced a short distance therefrom.

The belt pulley 31 comprises an outer cone shaped disk 38 and an inner cone shaped disk 39. Said outer disk 38 has an outwardly extending hub portion 40 carrying a setscrew 41, by means of which the disk 38 is secured to the drive shaft 26. The inner disk 39 has a hub portion 42 extending therefrom toward the frame 13, as best seen in Figure 3, and said disk 39 is slidably mounted on the shaft 26. The slidably mounted disk 39 is provided with a series of circumferentially spaced pins 43 extending outwardly therefrom slidably through the disk 38, as seen at 44, and the pins 43 are arranged in the same manner as the pins 36.

As best seen in Figures 1, 2 and 4, a thrust bearing 45 is slidably mounted on the hub 34 and has an inner annular section 46 through which portions of the pins 36 extend. The pins 36 are retained in engagement with the thrust bearing section 46 by spring retaining split rings 47 which engage in grooves 48 of the pins 36, as seen in Figure 2, and which bear against opposite sides of the inner thrust bearing part 46. The thrust bearing 45 includes an outer section 49 which is turnably mounted on said inner section 46 by antifriction ball bearing means 50 and which is provided with diametrically aligned outwardly projecting trunnions 51.

As best seen in Figures 1, 3 and 5, a thrust bearing, designated generally 52, includes an inner annular section which is mounted on the hub 42 and designated 53, and an outer section 54 which is turnably supported on the inner section 53 by antifriction bearings 55. The outer section 54 is provided with diametrically aligned outwardly projecting trunnions 56. The thrust bearing 52 abuts against a wear ring or washer 57 carried by the disk 39, as seen in Figure 3.

A pair of bearing supports 58 are suitably fixed to and project outwardly from the frame side 15, adjacent the ends thereof, and are provided at their outer ends with aligned bearings 59 and 60 in which are journalled a control shaft 61. Collars 62 are adjustably secured to end portions of the control shaft 61 and abut against remote ends of the bearings 59 and 60 to prevent the shaft 61 from sliding axially, relative to the bearings. A sleeve 63 is adjustably secured to the shaft 61 by a setscrew 64, substantially in transverse alignment with the driven shaft 23, and has an arm 65 extending inwardly therefrom. A fork 66, formed of complementary sections connected by a nut and bolt fastening 67, has aligned eyes 68 formed on complementary ends of the sections thereof and which turnably engage the trunnions 51. The opposite ends 69 of the fork sections straddle the free end of the arm 65 and are pivotally connected thereto by a fastening 70. Said arm 65 and the fork portions 69 are normally disposed between the control shaft 61 and the frame side 15.

As best seen in Figures 1 and 5, a fork 71 is composed of corresponding arms having outwardly offset complementary end portions including aligned eyes 72 which engage the trunnions 56 and opposite adjacently disposed end portions 73 which engage grooves 74, formed in opposite edges of a nut 75, and which are secured to the nut by fastenings 76. Thus, the nut is immovably secured to the fork 71. As best seen in Figure 3, a rod 77 has a threaded end portion 78, the outer part of which extends threadedly through the nut 75. The rod 77 is thus disposed with its axis at a right angle to the axis or plane of the fork 71. The rod 77 is provided with an opposite slotted end 79 which slidably receives a collar 80 which is provided with a diametrically extending bar 81 which slidably engages the slot 79, and which has outwardly projecting trunnions 82 which align with the bar 81, as best seen in Figure 9. A spring adjusting nut 83 is threadedly mounted on the rod 77 between the nut 75 and the slot 79 and adjacent said nut 75. An expansion coil spring 84 is disposed on the rod 77 between the collar 80 and the adjusting nut 83.

A lever 85 has a head portion 86 loosely disposed in the outer end of the slot 79, beyond the collar 80, as best seen in Figure 8. A pivot element 87 extends loosely through the head 86 and through the slotted portion 79 for swingably mounting the lever 85 for swinging movement in a direction lengthwise of the rod 77. The head 86 has substantially flat edge portions 88 and 89, which are disposed at an angle to one another. The edge portion 89 is spaced a greater distance from the axis of the pivot 87 than the edge portion 88.

A pair of corresponding ring members 90 and 91 are adjustably secured by setscrews 92 to the control rod 61 and have inwardly extending control arms 90a and 91a, respectively, the terminals of which are provided with eyes 90b and 91b, respectively, which turnably engage the trunnions 82, as seen in Figure 8. The collar 80, as seen in Figure 3, is supported by the arms 90a and 91a between the control rod 61 and the frame 13, for swinging movement with the arms relative to the frame.

As best seen in Figures 1 and 7, a supporting arm 93 is fixed to and extends outwardly from the frame side 15 between the sleeve 63 and the ring members 90 and 91, and has an eye 94 at its outer end in which the control rod 61 is loosely disposed. A toothed latch keeper segment 95 is fixed to the eye 94 and is disposed concentrically around the control rod 61. An actuating lever 96 is fixed to the control rod 61 and projects laterally therefrom, as seen in Figure 1. A conventional spring projected manually retractable latch 97 is carried by the lever 96 and is normally projected into latching engagement with the keeper 95 to retain the control rod 61 immovably in selected adjusted positions of rotation.

An endless V type belt 98 is trained around the pulleys 30 and 31. As seen in Figure 1, the control rod 61 is latched in a position so that the pulley section 39 is spaced from the pulley section 38. Consequently, the belt 98 engages the pulley 31 adjacent its hub and remote from its periphery. On the other hand, the pulley sections 32 and 33 are disposed substantially in abutting engagement, so that the belt 98 engages the pulley 30 adjacent its periphery. Accordingly, the pulley 30 and the driven shaft 23 will turn slower than the drive shaft 26 and the pulley 31 with the parts thus positioned. The R. P. M. of the shafts 26 and 23 can be varied by manually releasing the latch 97 and turning the rod 61 by the lever 96 in a counterclockwise direction, as seen in Figures 2 and 3. This will cause the actuating arm 65 and the actuating arms 90a and 91a to also swing counterclockwise, as seen in Figures 2 and 3. A thrust will thus be exerted by the fork 66 against the thrust bearing 45 and from the thrust bearing through the pins 36 to displace the pulley section 33 from right to left as seen in Figure 2, away from the pulley section 32, to enable the belt 98 to engage the pulley 30 nearer the driven shaft 23. Likewise, the arms 90a and 91a will exert a thrust from right to left, as seen in Figure 3, on the collar 80, rod 77 and fork 71. The fork 71 will in turn exert a thrust from right to left on the thrust bearing 52 which will in turn displace the movable pulley half 39 from right to left toward the stationary pulley half 38, so that the belt 98 will be required to engage the pulley 31 nearer the periphery thereof. As it will be readily obvious, the movement of the pulley halves 33 and 39 will occur simultaneously. By this adjustment of the variable speed drive, the pulleys 30 and 31 and the shafts 23 and 26, respectively, can be caused to turn at more nearly the same speed, at the same speed, or the shaft 26 and its pulley 31 may turn at a speed slower than the R. P. M. of the driven shaft 23 and its pulley 30. Thus, the driven shaft 23 will be revolved much faster than the drive shaft 26, when pulley 30 is fully open and pulley 31 is fully closed, as the drive shaft 26 is turned relative to the driven shaft 23 with the pulleys disposed as seen in Figure 1. By enlarging the pulleys, the extreme ratios of the R. P. M. of the shafts 23 and 26 can be increased.

In a fully open position of either belt pulley, the belt 98 is spaced slightly from the pins 43 or 36 thereof. Stops 100 are provided on the segment 95 to engage lever 96 so that rod 61 cannot be turned past a fully open position of either belt pulley. Long stiff driving belts may be employed for connecting shafts located considerable distances apart and which belts, due to their stiffness, are incapable of effectively operating on pulley surfaces of very small diameters. It will also be noted that the control rod 61 provides a means for actuating the belt pulleys simultaneously irrespective of the spacing between the belt pulleys, since said control rod could be of any length.

It will also be apparent that the spring 84 exerts a constant spring pressure on the rod 77, fork 71 and thrust bearing 52, tending to displace the slidable pulley section 39 toward the fixed pulley section 38, independently of the control rod 61 and thrust bearing 45, for maintaining a proper resilient tension on the belt 98 to thus keep the belt properly tensioned to prevent slippage thereof relative to the pulleys and also to prevent excessive wear on the belt. This spring tension can be increased by moving the spring tensioning nut 83 away from the fork 71, or decreased by moving the nut 83 toward the fork 71. Furthermore, this spring tension remains constant irrespective of the different adjustments of the halves of the individual pulleys 30 and 31.

The tension of spring 84 can also be substantially removed from the pulley half 39 by swinging the lever 85 from its position of Figure 1 and its full line position of Figure 8 to its dotted line position of Figure 8. When the lever 85 is thus swung counterclockwise, the head 86 turns in the slot 79 and the rounded edge portion 99 of said head, disposed between the edges 88 and 89, functions as a cam by a slidable engagement with the adjacent sides of the collar 80 and bar 81 to displace the head pivot 87 away from the collar 80 to thereby exert a pull on the rod 77 from left to right as seen in Figures 1 and 8, to pull the fork 71, thrust bearing 52 and pulley half 39 away from the pulley half 38 and away from the belt, to thus release the belt. However, the belt 98 retains its position relative to the pulleys 30 and 31 as set by the control lever 96 even when the clutch is thus released by removing the tension of spring 84 from the pulley half 39, since only the lower pulley 31 is thus opened. When the clutch is released, pins 43 of pulley 31 will prevent a stiff springy belt from moving too far inwardly of pulley 31. The clutch functions only to stop and start the driven shaft 23 at any speed, without stopping the drive shaft 26.

The sliding pulley sections 33 and 39 can only be moved by the rod 61 to accomplish a change in the effective diameters of the pulleys 30 and 31 when the clutch is engaged and the pulleys are revolving. However, this can be accomplished the instant that the clutch is engaged and the shaft 23 and pulley 30 commence to revolve.

Various modifications and changes are contemplated and may obviously be resorted to, without departing from the spirit or scope of the invention as hereinafter defined by the appended claims.

I claim as my invention:

1. An apparatus of the character described comprising an elongated frame member, parallel shafts journalled in said frame member including a drive shaft and a driven shaft, a first belt pulley connected to the driven shaft, a second belt pulley connected to the drive shaft, an endless V-belt trained over said belt pulleys, each belt pulley including a fixedly mounted cone shaped disk forming one pulley section and a slidably mounted cone shaped disk section, means slidably connecting the fixed and slidable sections of each belt pulley for rotation of said sections as a unit with the shaft individual thereto, a control rod, bearing means supported by the frame member in which said control rod is journalled for rotation about an axis disposed substantially crosswise of the axes of said shafts, a first lever means and a second lever means secured to the control rod and projecting laterally therefrom, a first thrust bearing means swively and non-slidably connected to the slidable connecting means of said first belt pulley and disposed between the frame member and the fixed pulley section thereof, said fixed pulley section being disposed between said first thrust bearing means and the slidable pulley section of the first belt pulley, a connecting means pivotally connected to said first thrust bearing means and to said first lever means, a second thrust bearing means swively mounted on the second belt pulley, between said belt pulley and the frame member and bearing directly against the slidable belt pulley section thereof, a second connecting means pivotally connected to said second thrust bearing means and to said second lever means, manually actuated means connected to and projecting laterally from the control rod for turning the control rod in either direction for simultaneously exerting a thrust or pull on said first and second thrust bearing means through the connecting means individual thereto for opening one of the belt pulleys and simultaneously closing the other belt pulley for radially varying the position of engagement of the belt with the belt pulleys for varying the relative speed of rotation of the belt pulleys and the shafts individual thereto, said second connecting means including a rod, a collar pivotally connected to said second lever means for slidably engaging the rod of said second connecting means, and spring means carried by said second connecting means and bearing against said collar for urging the second connecting means toward said second belt pulley for urging the second belt pulley toward a closed position for yieldably tensioning the belt.

2. An apparatus as in claim 1, and an adjustable spring stop carried by said rod for varying the tension on said spring.

3. An apparatus as in claim 2, a cam member pivotally connected to said rod and bearing against said collar and forming a stop to limit sliding movement of the second connecting means toward said second belt pulley, and means for turning said cam in one direction for displacing said second connecting means away from the second belt pulley and relative to said second lever means to release the tension on said belt.

4. An apparatus of the character described comprising an elongated frame member, parallel shafts journalled in said frame member including a drive shaft and a driven shaft, a first belt pulley connected to the driven shaft, a second belt pulley connected to the drive shaft, an endless V-belt trained over said belt pulleys, each belt pulley including a fixedly mounted cone shaped disk forming one pulley section and a slidably mounted cone shaped disk section, means slidably connecting the fixed and slidable sections of each belt pulley for rotation of said sections as a unit with the shaft individual thereto, a control rod, bearing means supported by the frame member in which said control rod is journalled for rotation about an axis disposed substantially crosswise of the axes of said shafts, a first lever means and a second lever means secured to the control rod and projecting laterally therefrom, a first thrust bearing means swively and non-slidably connected to the slidable connecting means of said first belt pulley and disposed between the frame member and the fixed pulley section thereof, said fixed pulley section being disposed between said first thrust bearing means and the slidable pulley section of the first belt pulley, a connecting means pivotally connected to said first thrust bearing means and to said first lever means, a second thrust bearing means swively mounted on the second belt pulley, between said belt pulley and the frame member and bearing directly against the slidable belt pulley section thereof, a second connecting means pivotally connected to said second thrust bearing means and to said second lever means, manually actuated means connected to and projecting laterally from the control rod for turning the control rod in either direction for simultaneously exerting a thrust or pull on said first and second thrust bearing means through the connecting means individual thereto for opening one of the belt pulleys and simultaneously closing the other belt pulley for radially varying the position of engagement of the belt with the belt pulleys for varying the relative speed of rotation of the belt pulleys and the shafts individual thereto, said first lever means being adjustably secured to said control rod, a bearing in which said driven shaft is journalled and supported relative to the frame member, and means for adjustably securing said bearing to the frame for varying the spacing between the drive shaft and driven shaft.

References Cited in the file of this patent

UNITED STATES PATENTS

| 2,342,941 | Johnson | Feb. 29, 1944 |

FOREIGN PATENTS

| 36,534 | Sweden | Apr. 15, 1914 |
| 136,293 | Germany | Nov. 24, 1902 |